W. TIRRELL.
COMPOSITE OUTER SOLE.
APPLICATION FILED MAR. 11, 1916.
1,268,408.
Patented June 4, 1918.
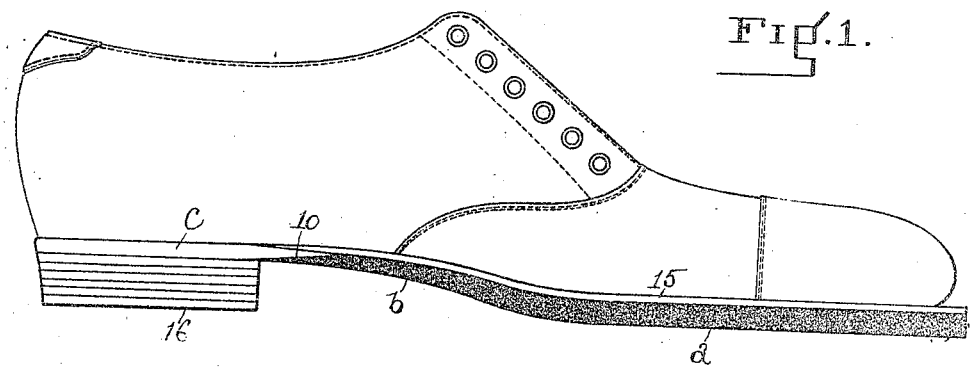
Fig. 1.
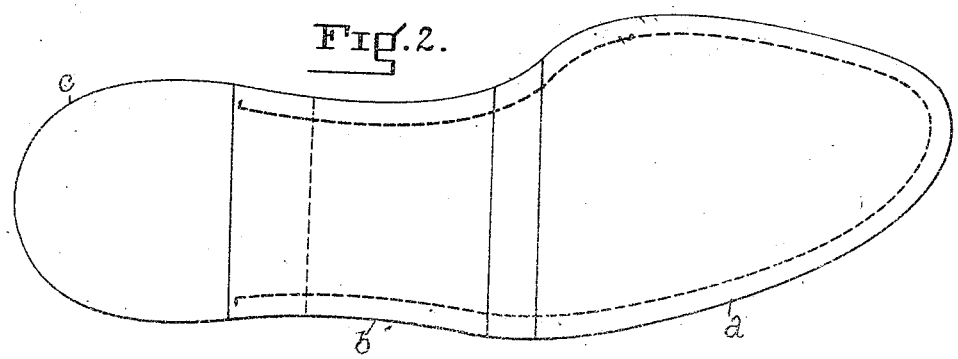
Fig. 2.
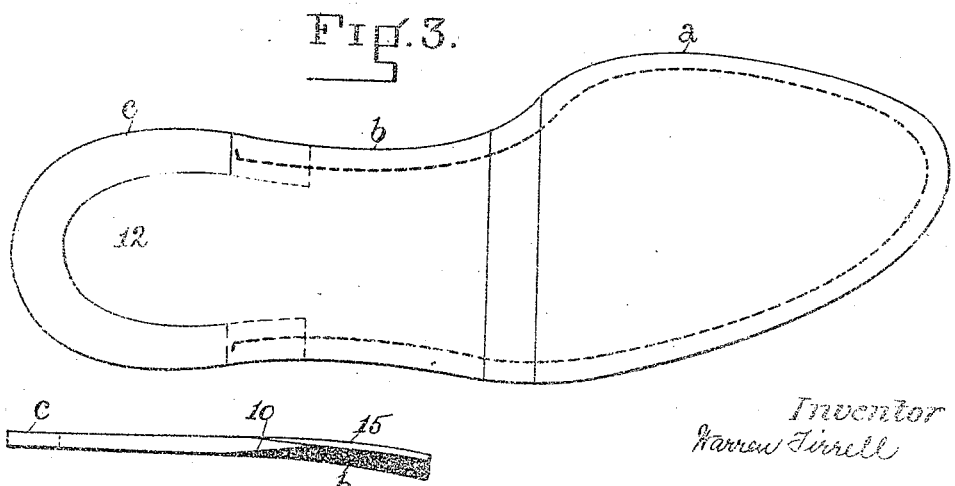
Fig. 3.
Fig. 4.
Inventor
Warren Tirrell
By Jas. H. Churchill
Attorney

UNITED STATES PATENT OFFICE.

WARREN TIRRELL, OF BROCKTON, MASSACHUSETTS.

COMPOSITE OUTER-SOLE.

1,268,408.

Specification of Letters Patent.  Patented June 4, 1918.

Application filed March 11, 1916. Serial No. 83,652.

*To all whom it may concern:*

Be it known that I, WARREN TIRRELL, a citizen of the United States, and a resident of Brockton, in the county of Plymouth and State of Massachusetts, have invented an Improvement in Composite Outer-Soles, of which the following description, in connection with the accompanying drawings, is a specification, like characters on the drawings representing like parts.

This invention relates to a composite outer sole for boots and shoes.

The invention has for its object to provide an outer sole having the desirable features of an all rubber or fiber outer sole and having in addition thereto the desirable feature of being capable of being applied to the upper with the machines and processes now employed in factories in the manufacture of boots and shoes provided with leather outer soles.

To this end the composite outer sole has its tread and shank portions composed of rubber, or compositions of rubber and fiber, such as now used in the manufacture of the so-called rubber or fiber soles, and its heel portion is composed in whole or in part of leather or like material as will be described, which leather portion is vulcanized to the rear end of the rubber shank portion.

The particular features of this invention will be pointed out in the claim at the end of this specification.

Figure 1 is a side elevation of a shoe provided with a composite outer sole embodying this invention.

Fig. 2, an underside view of the outer sole shown in Fig. 1.

Fig. 3, an underside view of a modified form of composite outer sole, and

Fig. 4, a side elevation of the rear portion of the outer sole shown in Fig. 3.

Referring to the drawings, *a* represents the forepart or tread portion, *b* the shank, and *c* the heel portion of a composite outer sole embodying this invention.

The tread portion *a* and the shank *b* are made of the materials now commonly employed in the so-called rubber or fiber outer soles, which may be rubber or other gum alone, or mixed with other materials, and which in some cases are called fiber outer soles as they contain a substantially large percentage of fiber which is worked into the rubber or other gum. The shank portion *b* is made of substantially the same length as the shank of the ordinary rubber outer sole, and is preferably provided at its rear end with a beveled upper surface 10 which is extended downwardly from the upper surface of the shank portion to the bottom surface thereof and to which is vulcanized the heel portion *c*, preferably of leather, but which may be of leatherboard, fiber-board or the like, and which may be made as a heel lift as represented in Fig. 2, or which may be made in the nature of a rand as represented in Fig. 3. The heel portion *c* is provided at its front end with a beveled under surface, which extends upwardly from the bottom surface of the heel portion to the upper surface thereof and rests upon the beveled upper surface of the shank portion so as to have the upper and bottom surfaces of the heel portion substantially flush with the upper and lower surfaces of the shank portion.

When a heel lift is used as represented in Fig. 2, the rubber shank *b* terminates at or near the breast of the heel, but when the rand is used, a rubber heel portion or tongue 12 is extended from the rear portion of the rubber shank *b* and fills the opening formed by the rand, so that in this case the heel portion of the outer sole is provided with a rubber center 12 and a leather outer portion *c*.

The leather heel portion and the rubber shank are firmly secured together so as to practically form one structure by vulcanizing these parts together in a manner well understood.

It will be observed that the sole portion *a* and shank portion *b* of the composite outer sole remain of the same or substantially the same length as these parts in an all rubber outer sole, so that the cushioning effect, flexibility, waterproofing and other properties possessed by those parts of the all-rubber outer sole are retained in the composite insole, while the disadvantges of the rubber heel portion of the all-rubber outer sole in the manufacture of the shoe are avoided by the leather heel portion of the composite outer sole.

When an all rubber outer sole or one having its heel portion made of rubber is used in the manufacture of the shoe, it is necessary to attach the same to the heel portion of the shoe by hand, as it is impossible to finish up the heel seat of a shoe when the sole is all rubber or fiber, as a good, close rand cannot be made on rubber as it is too soft, and therefore it is customary to attach an extra piece of leather (a leather lift) and nail it by hand to the heel seat of the shoe before the rubber sole is laid onto the shoe. This method requires a lot of extra hand work, as the leather lift has to be fitted and nailed and cemented before the rubber sole is laid.

The present invention does away with the extra heel lift, also extra work of hand fitting and cementing, and avoids a double thickness at the heel seat that causes the heel seat to look uneven and out of level.

The sole can be laid and heel seat nailed and finished up the same as an leather sole without any extra work whatsoever, and there is obtained a good rand and finish without any extra work, as the composite outer sole above described, can be applied by machinery and put through the same process employed in the factory when an all leather outer sole is secured to the welt 15 and to the heel portion of the upper, thereby effecting a material saving in cost to the manufacturer while at the same time the resiliency and other desirable properties of the shank and sole portions of the all-rubber outer sole are preserved.

The leather heel portion c may be made of any desired width before it is vulcanized to the rubber shank, so that the composite outer soles may be made as a standard for all widths of lasts, as the leather heel portion can be trimmed off to any size desired.

By reference to Fig. 1, it will be seen that the rubber portion of the composite outer sole extends from the toe to near the breast of the heel 16, and the leather portion of the heel extends from near said breast to the back or rear end of the shoe, and, as a result, the shoe is not only capable of being made on the machines now in use in factories at a material saving in cost, but its heel portion can be given the desirable finish of a shoe having an all-leather outer sole, and at the same time is provided with the desirable portions of the all-rubber outer sole, to wit: the rubber shank and tread portions, and as the rubber shank portion extends from the tread portion to near the breast of the heel, the flexibility of the all-rubber outer sole is retained.

By the term "rubber" as used in the claim, I desire to be understood as including not only pure rubber but also compositions of rubber with other materials and such as is now used in the manufacture of the so-called rubber or fiber outer soles. Furthermore by the term "leather" as used in the claim I desire to be understood as including not only leather but such materials as are used in the manufacture of boots and shoes as substitutes therefor, such, for instance, as leather-board, fiber-board and the like.

Claim:

A boot or shoe having a composite sole composed of an integral toe, tread and shank portion of rubber, said shank portion having its upper surface beveled toward the rear end thereof, and a leather heel portion projecting beyond the front edge of the heel proper to a point of the shank adjacent to the heel proper, and having its under surface beveled from the said edge of the heel proper and overlapping the said beveled portion of the shank to form a joint within the shank and near the heel portion of the composite sole with the upper surface of the leather heel portion substantially flush with the upper surface of the rubber shank.

In testimony whereof, I have signed my name to this specification.

WARREN TIRRELL.